(12) United States Patent
Johnson

(10) Patent No.: US 8,051,105 B1
(45) Date of Patent: Nov. 1, 2011

(54) DIRECTING SEARCHES ON TREE DATA STRUCTURES

(75) Inventor: Stephen Johnson, Sudbury, MA (US)

(73) Assignee: The Mathworks, Inc., Natick, MA (US)

( * ) Notice: Subject to any disclaimer, the term of this patent is extended or adjusted under 35 U.S.C. 154(b) by 390 days.

(21) Appl. No.: 11/651,621

(22) Filed: Jan. 10, 2007

(51) Int. Cl.
*G06F 17/30* (2006.01)

(52) U.S. Cl. ..................................................... 707/798

(58) Field of Classification Search ............. 707/1, 100, 707/3, 102, 798
See application file for complete search history.

(56) References Cited

U.S. PATENT DOCUMENTS

| | | | |
|---|---|---|---|
| 5,493,678 A * | 2/1996 | Arcuri et al. | 707/1 |
| 7,000,213 B2 * | 2/2006 | Banerjee et al. | 716/18 |
| 7,158,975 B2 * | 1/2007 | Mazzagatti | 707/797 |
| 2005/0149503 A1 * | 7/2005 | Raghavachari | 707/3 |
| 2006/0190491 A1 * | 8/2006 | Kuji | 707/104.1 |
| 2008/0222087 A1 * | 9/2008 | Balmin et al. | 707/2 |

* cited by examiner

*Primary Examiner* — James Trujillo
*Assistant Examiner* — Amresh Singh
(74) *Attorney, Agent, or Firm* — Venable LLP; Michael A. Sartori; Christopher Ma

(57) ABSTRACT

A computer-implemented method to access a tree data structure in a computing environment is provided. The method includes generating a tree data structure in a computing environment, wherein the tree data structure includes nodes and links to link the nodes, wherein each node includes fields for various data types, accessing contents of the tree data structure with a single command in a computing environment. The single command references at least one specified node of the tree data structure, wherein the single command is based on at least one of: a command to access contents of the tree data structure for all nodes associated with the specified node, a command to access contents of the tree data structure for all nodes in a subtree of the at least one specified node, and a command to access at least a subset of contents of the tree data structure for all nodes in a subtree of the at least one specified node, and providing in the computing environment the contents of the tree data structure based on the single command.

31 Claims, 15 Drawing Sheets

DIRECTING SEARCHES ON TREE DATA STRUCTURES

BACKGROUND

Data structures in the form of trees are used to represent data and programs that are hierarchically structured. Even non-hierarchically structured data may be represented in a tree structure. The tree data structure is composed of nodes and links between nodes. Linked nodes are said to be in parent-child relationships. In simple tree data structures, each node may store some amount of data and links to its child nodes. For example, in a tree data structure representing an organizational chart, a node may contain the name and title of an individual employee, and links pointing to nodes containing data on each employee working for that employee. The XML and HTML standards and parsers for use with computer programming languages may also employ tree data structures.

Often, tree data structures need to be searched for information, where the search considers the structure of the tree as well as the data that might reside on each node. For example, a tree data structure representing an organizational chart may need to be searched to find all employees who are managers who have employees named Fred working for them. Current methods for searching tree data structures involve writing computer program code designed for the specific tree data structure search and the specific type of search being performed. Prefix, infix, and postfix traversals are common methods of searching tree data structures. Writing the computer program code to perform a specific type of tree search can be time consuming, and there is often no intuitive way for a user to interact with a tree searching program.

SUMMARY

A computer-implemented method to access a tree data structure in a computing environment is provided. The method includes generating a tree data structure in a computing environment, wherein the tree data structure comprises a plurality of nodes and a plurality of links to link the nodes, wherein each node embodies a plurality of fields for a plurality of data types, accessing contents of the tree data structure with a single command in a computing environment, wherein the single command references at least one specified node of the tree data structure, wherein the single command is based on at least one of: a command to access contents of the tree data structure for all nodes associated with the specified node, a command to access contents of the tree data structure for all nodes in a subtree of the at least one specified node, and a command to access at least a subset of contents of the tree data structure for all nodes in a subtree of the at least one specified node, and providing in the computing environment the contents of the tree data structure based on the single command. The subtree may be a full subtree.

A computer-readable medium comprising software, which when executed by a computer system causes the computer system to perform operations for a method to access tree data structures is provided. The operations include generating a tree data structure in a computing environment, wherein the tree data structure comprises a plurality of nodes and a plurality of links to link the nodes, wherein each node embodies a plurality of fields for a plurality of data types, accessing contents of the tree data structure with a single command in a computing environment, wherein the single command references at least one specified node of the tree data structure, wherein the single command is based on at least one of: a command to access contents of the tree data structure for all nodes associated with the specified node, a command to access contents of the tree data structure for all nodes in a subtree of the at least one specified node, and a command to access at least a subset of contents of the tree data structure for all nodes in a subtree of the at least one specified node, and providing in the computing environment the contents of the tree data structure based on the single command. The subtree may be a full subtree.

A system to access a tree data structure in a computing environemnt is provided. The system includes means for generating a tree data structure in a computing environment, wherein the tree data structure comprises a plurality of nodes and a plurality of links to link the nodes, wherein each node embodies a plurality of fields for a plurality of data types, means for accessing contents of the tree data structure with a single command in a computing environment, wherein the single command references at least one specified node of the tree data structure, wherein the single command is based on at least one of: a command to access contents of the tree data structure for all nodes associated with the specified node, a command to access contents of the tree data structure for all nodes in a subtree of the at least one specified node, and a command to access at least a subset of contents of the tree data structure for all nodes in a subtree of the at least one specified node, and means for providing in the computing environment the contents of the tree data structure based on the single command. The subtree may be a full subtree.

Further features of the invention, as well as the structure and operation of various embodiments of the invention, are described in detail below with reference to the accompanying drawings.

BRIEF DESCRIPTION OF THE DRAWINGS

The foregoing and other features of the invention will be apparent from the following, more particular description of exemplary embodiments of the invention, as illustrated in the accompanying drawings wherein like reference numbers generally indicate identical, functionally similar, and/or structurally similar elements. The left most digits in the corresponding reference number indicate the drawing in which an element first appears.

DEFINITIONS

Figure 1:
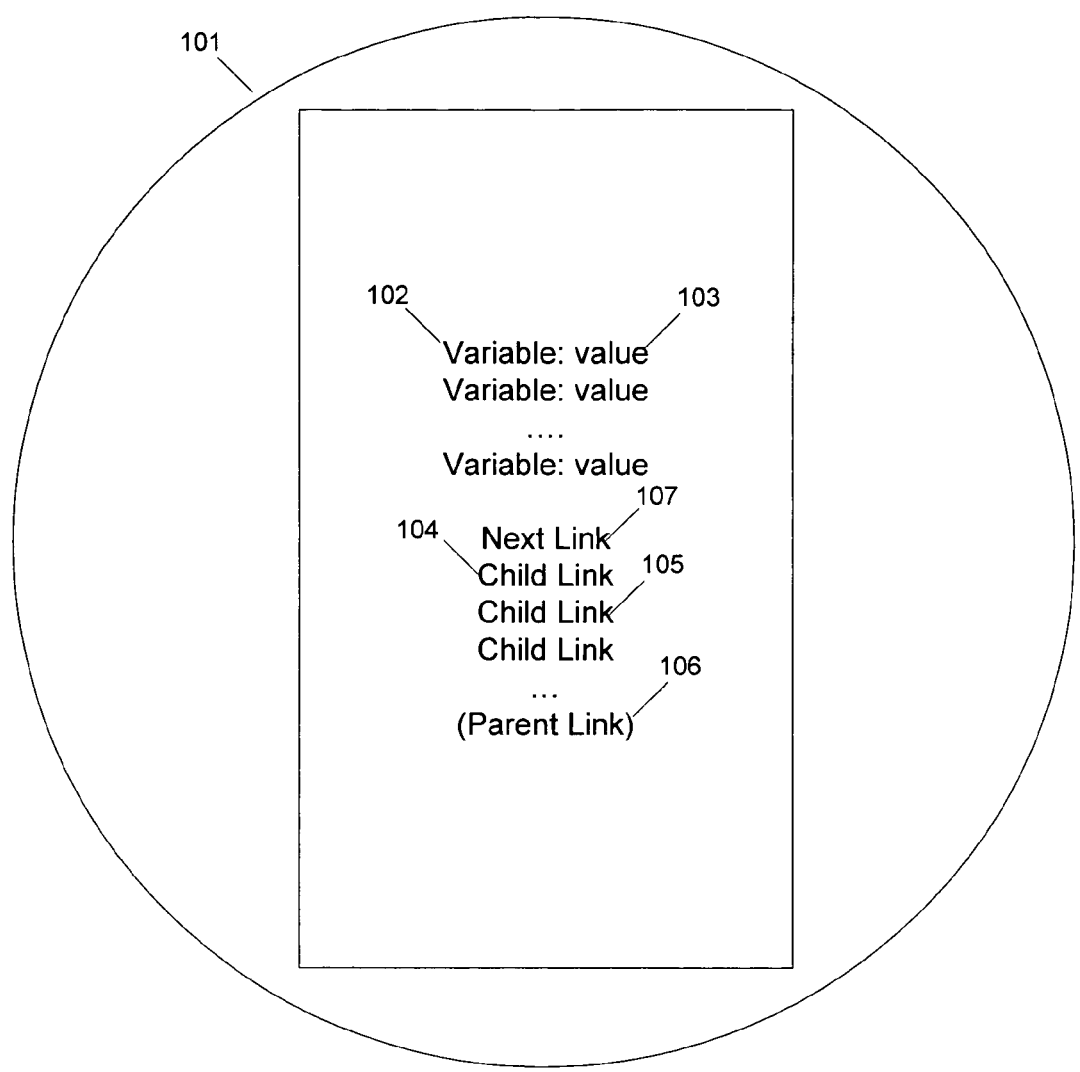
FIG. 1 depicts an exemplary embodiment of a node

In describing the invention, the following definitions are applicable throughout (including above).

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with interne access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, or a chip set; a system-on-chip (SoC) or a multiprocessor system-on-chip (MPSoC); an optical computer; a quantum computer; a biological computer; and an apparatus that may accept data, may process data in accordance with one or more stored software programs, may generate results, and typically may include input, output, storage, arithmetic, logic, and control units.

"Software" may refer to prescribed rules to operate a computer. Examples of software may include: software; code segments; instructions; applets; pre-compiled code; compiled code; computer programs; and programmed logic.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a memory chip; and/or other types of media that can store machine-readable instructions thereon.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those that may be made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet. Exemplary networks may operate with any of a number of protocols, such as Internet protocol (IP), asynchronous transfer mode (ATM), and/or synchronous optical network (SONET), user datagram protocol (UDP), IEEE 802.x, etc.

DETAILED DESCRIPTION OF EMBODIMENTS OF THE PRESENT INVENTION

Exemplary embodiments of the invention are discussed in detail below. While specific exemplary embodiments are discussed, it should be understood that this is done for illustration purposes only. In describing and illustrating the exemplary embodiments, specific terminology is employed for the sake of clarity. However, the invention is not intended to be limited to the specific terminology so selected. A person skilled in the relevant art will recognize that other components and configurations may be used without parting from the spirit and scope of the invention. It is to be understood that each specific element includes all technical equivalents that operate in a similar manner to accomplish a similar purpose. The examples and embodiments described herein are non-limiting examples.

Exemplary embodiments may exist as part of a text-based computing environment, such as, e.g. MATLAB® by The MathWorks, Inc. of Natick, Mass., USA (hereinafter "The MathWorks"); MATHEMATICA® by Wolfram Research; Comsol Script® by Comsol, Inc.; Scilab from INRIA; a C++ Integrated Development Environment; a Java development environment; elements of an integrated development environment such as a textual editor, for example GNU Emacs. The techniques described herein may be embodied in functional components, such as, for example, in a function, a model, a class, or other program element. Exemplary embodiments may exist as part of a computing environment that has graphical models, such as, e.g. SIMULINK® and STATEFLOW®, of The MathWorks, Inc. of Natick, Mass., USA. The techniques described herein may be embodied in functional components, such as, for example, in a simulation block, or a simulation toolset.

An exemplary embodiment may be implemented with a computing environment, such as, for example, MATLAB® computing environment by The MathWorks; MATHEMATICA® by Wolfram Research; Comsol Script® by Comsol, Inc.; Scilab from INRIA; a C++ Integrated Development Environment; a Java development environment; elements of an integrated development environment such as a textual editor, for example GNU Emacs. The computing environment may interpret or execute commands written in an array-based language. An array based language may refer to a language adapted for processing array data types. Examples of array-based languages may include the language of MATLAB® computing environment and languages compatible with the MATLAB® computing environment. A language may be said to be compatible with the MATLAB® computing environment if at least a subset of its commands are capable of being executed in the MATLAB® computing environment.

An exemplary embodiment allows for searching a tree data structure based on a single command. The single command may be based on a "select" command or a "move" command. The single command may make use of one or more of a "associated with" command, a "subtree" command, and a "full subtree" command. The single command may make use of one or more of the logical operators EQUALS, AND and OR.

A tree data structure may be composed of nodes and links between nodes. FIG. 1 depicts an exemplary embodiment of a node. In FIGS. 1-12, nodes are depicted as circles, and links are depicted as lines with arrows. The arrow for the link indicates the direction the link may be followed in. The internal representation of the tree data structure in a computer may be a combination of pointers, lists, arrays or other data structures as deemed appropriate by one skilled in the art.

Figure 2:
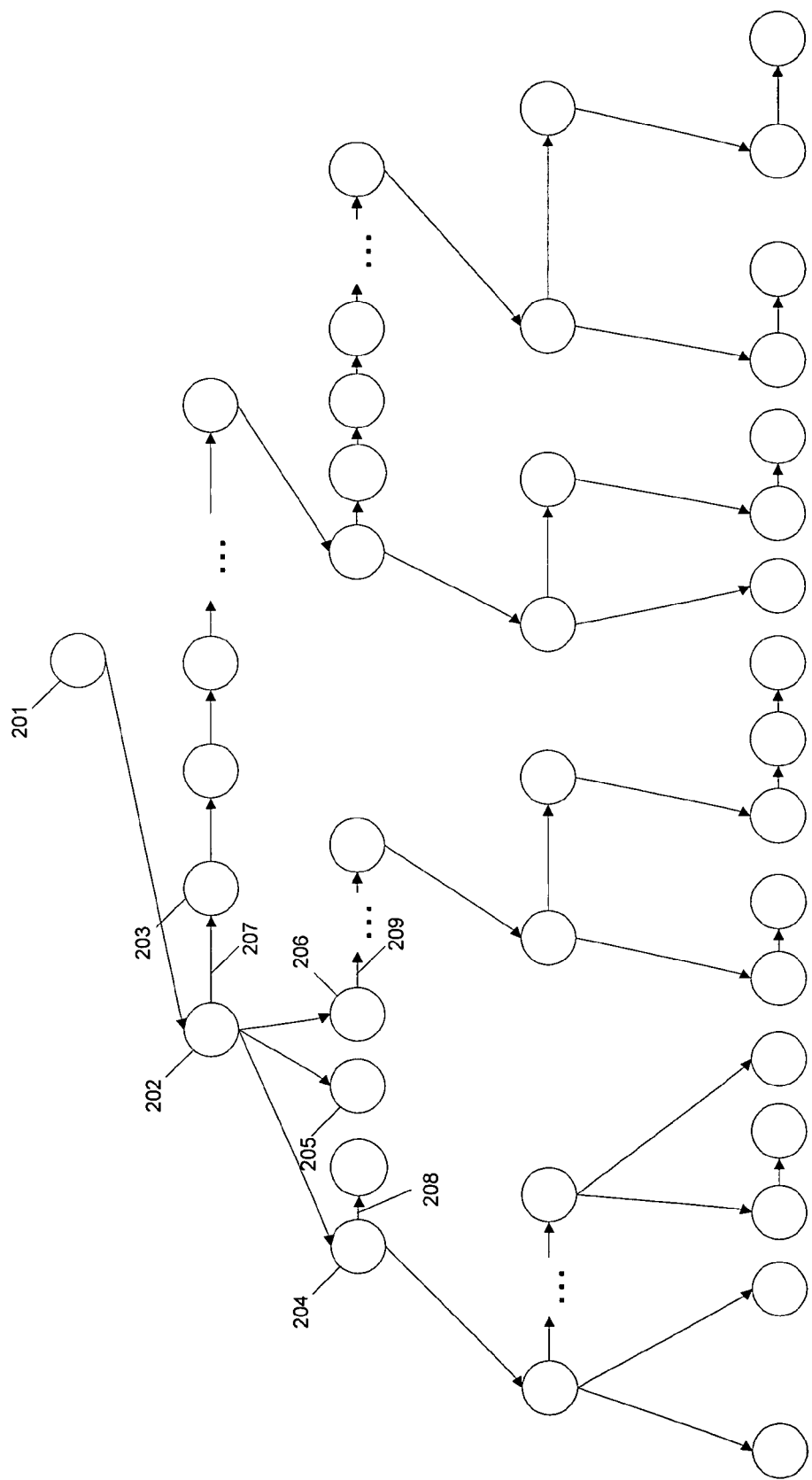
FIG. 2 depicts an exemplary embodiment of an N-ary tree with next links

As depicted in FIG. 1, a node 101 may store a plurality of data fields 102 that may have a plurality of data types 103. For example, the node 101 may contain a string field that has a string representing a name and an integer field that has an integer representing an age. The node 101 may also contain links 104 to other nodes in the tree data structure, such that a command can be issued in a program to allow the program to reach another node from the current node. A link may point to a child node of the node 101 containing the link. This link may be referred to as a child link 105. FIG. 2 depicts an exemplary embodiment of an N-ary tree with next links. The node 202 is the child node of node 201, and nodes 204, 205 and 206 are the child nodes of node 202. Node 206 has no child nodes. The node 101 may have a plurality of child links 105, each pointing to a separate child node. The node 101 may have a link that points to the parent node of the node 101. This link may be referred to as a parent link 106. Referring to FIG. 2, node 201 is the parent node of node 202, and node 202 is the parent node of nodes 204, 205, 206. The top node 201 is a node which has no parent node. In FIG. 1, the parent link 106 is in parentheses to indicate that the node 101 may not have a parent node or that the node 101 may not store any information. The node 101 may have a link that points to another node which is not a parent node of node 101 and is not a child node of node 101 or any other node. This link may be referred to as a next link 107. Referring to FIG. 2, nodes 202, 203, 204 and 206 each contain a next link 107. Node 202 contains next link 207 which links to node 203. Node 204 contains next link 208, and node 206 contains next link 209. Each node 101 may be constrained up to one next link. Each node 101 may be linked to by a single next link. Each node 101 may be constrained to contain up to two child links. The tree data structure may have one or more top nodes. Referring to FIG. 2, node 201 is the top node of the tree data structure.

Figure 3:
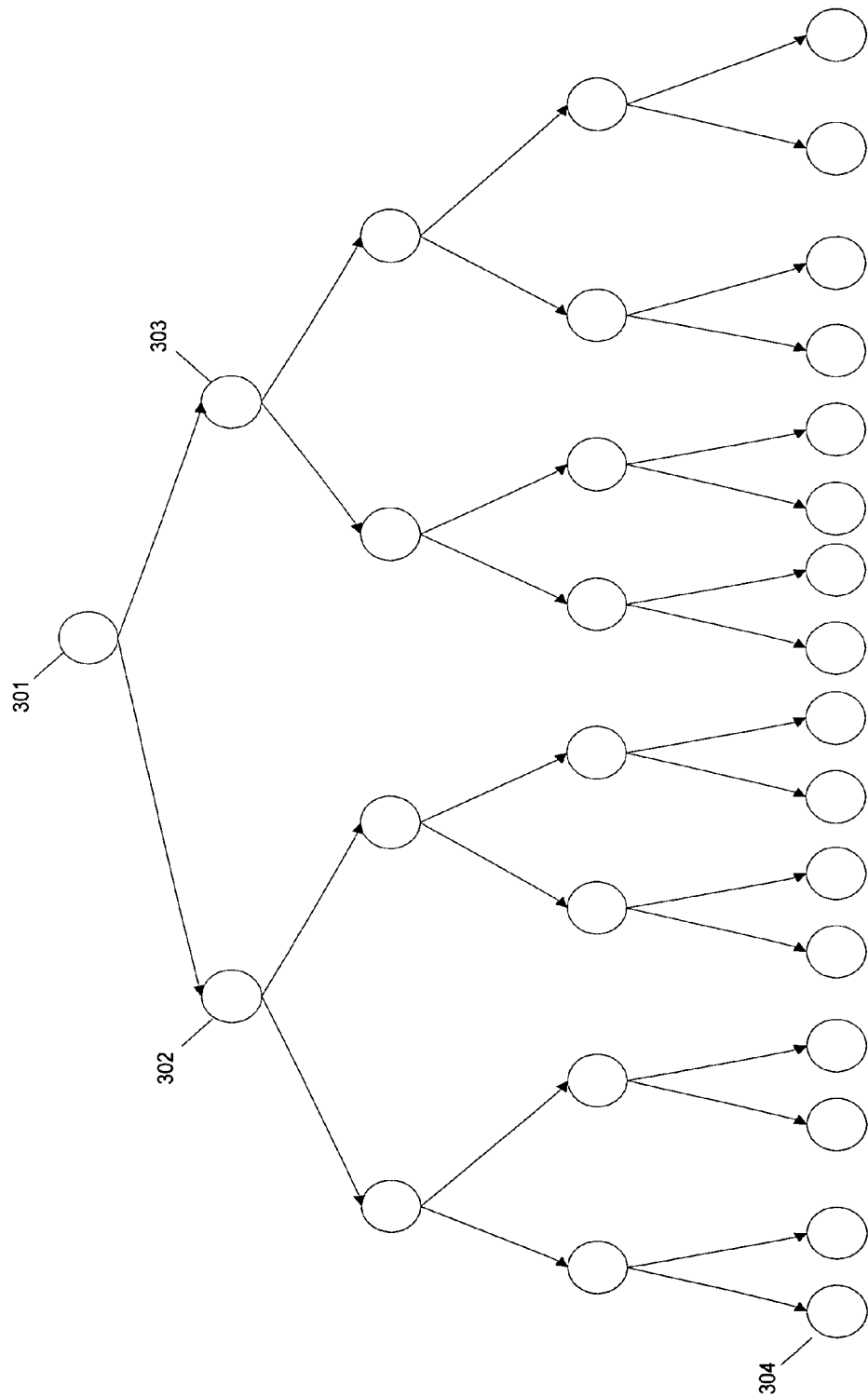
FIG. 3 depicts an exemplary embodiment of a binary tree

FIG. 3 depicts an exemplary embodiment of a binary tree. A binary tree is a tree data structure wherein each node in the tree data structure is limited in the number of links it may contain to child nodes. A node in a binary tree may have either two child nodes, one child node, or zero child nodes. A node in a binary tree may not have any more than two child nodes. For example, node 301 is the top of the binary tree and has two child nodes 302 and 303, and node 304 has no child nodes.

Figure 4:
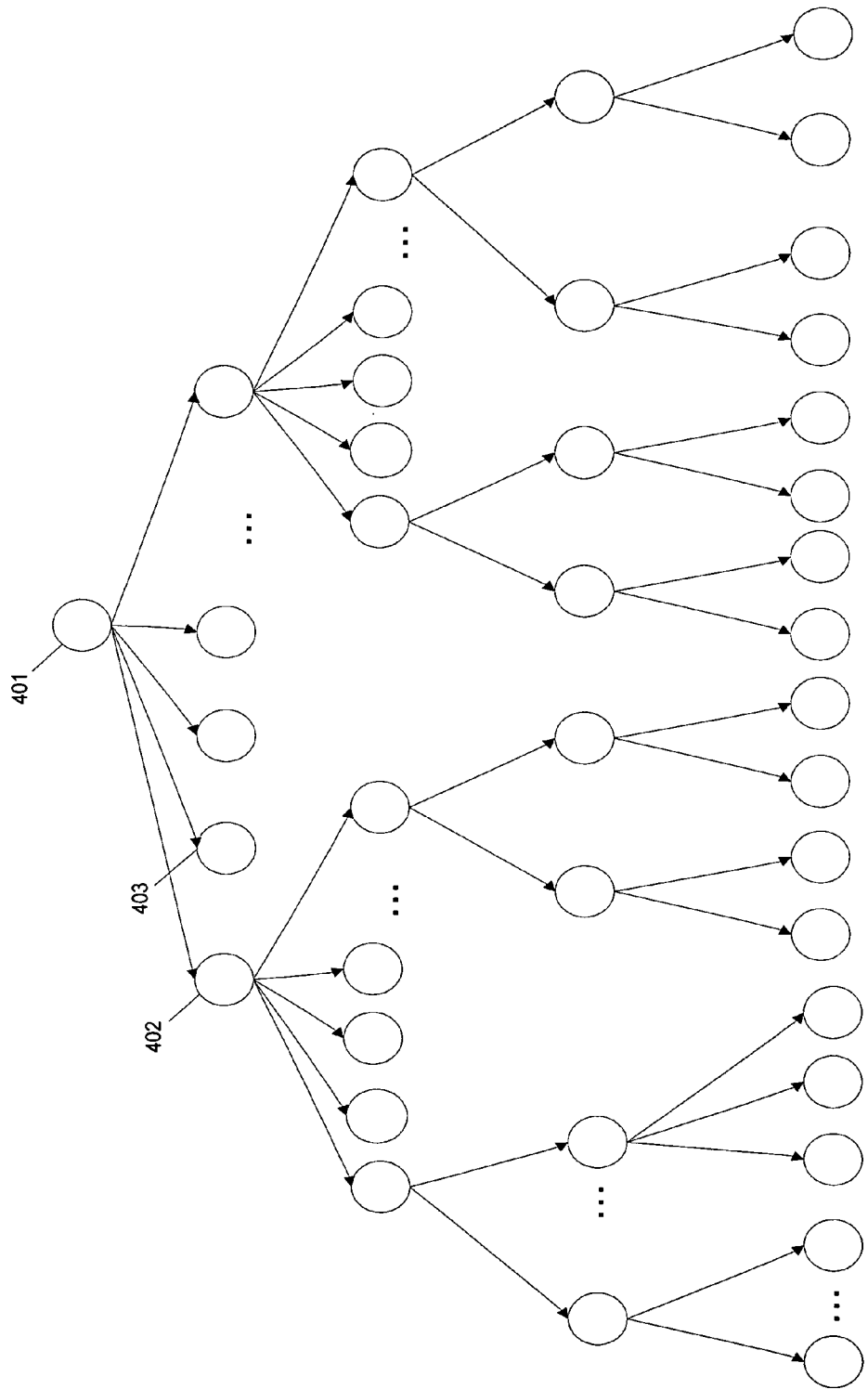
FIG. 4 depicts an exemplary embodiment of an N-ary tree

FIG. 4 depicts an exemplary embodiment of an N-ary tree data structure. An N-ary tree is a tree data structure wherein each node in the tree data structure is not limited in the number of links it may contain to child nodes. A node in an N-ary tree may contain links to any number greater than or equal to zero child nodes. For example, node 401 is the top node of the N-ary tree, and has multiple child nodes 402, 403, etc. Node 402 has multiple child nodes as well.

In a tree data structure, recursion may be used to follow links from multiple nodes in response to a single command by invoking repetition of a particular task. For example, in an acyclical binary tree data structure, recursively following child links from the top node of the tree will result in visiting every node in the binary tree data structure. The child links of the top node are both followed to the one or two respective child nodes they point to. Then, each of the child links in each of these nodes is also followed to the four respective nodes they point to. This continues until none of the nodes reached has a child link left to follow.

In one exemplary embodiment, a select command may be applied to a set of nodes from a tree data structure to identify those nodes that have a particular property and/or are linked in the tree data structure in particular ways to other nodes with other particular properties. A property that may be used to identify nodes with the select command may be, for example, the value of a specific data field stored in the node, or the value of a specific data field stored on a separate node that is connected to the node by a particular link. The select command may be referred to as a find command, a search command, an identify command or by any other name. A select command may be initiated through interaction with a user interface, for example, a form or a graphical user interface. As an option, the select command may take the form path.S, where path is a list of link names in the tree data structure, and S is a set of nodes. The path.S command may find all nodes in the tree data structure reached by following the links in path, and place those nodes in S.

In one embodiment of the invention, a move command may be applied to a set of nodes from a tree data structure to identify all nodes that are related to the nodes in the set in some particular way. A particular way that nodes may be identified as having a relation to nodes in the set using the move command may be, for example, by determining whether the node is a child node of a node in the set of nodes. The move command may be referred to as a path command, find command, select command, identify command, or by any other name. A move command may be initiated through interaction with a user interface, for example, a form or a graphical user interface. As an option, the move command may take the form move.S.

A list in the tree data structure may include nodes which can be reached from a specified node via recursive following of next links from the specified node. The list of the nodes may be referred to as nodes "associated with" the specified node. The specified node may be referred to as the list head node. The list may include nodes which may be reached from the head of the list by following the next link from the list head node, then following the next link from the node reached, and so on until a node without a next link is reached. The list head node may also be part of the list. The list in the tree data structure may not need to be implemented as a linked list or another "list" data structure. Any data structure, such as, for example, an array, a tree, a linked list, a hash table, etc. may be used, as deemed appropriate by one of skill in the art. A single command may be used to access the list for a specified node or nodes in the tree data structure. In an exemplary embodiment, the single text command may take the form list (S), where S is a set of at least one node from a tree data structure. As an option, the single command may take the form S.List, where S is a set of at least one node from the tree data structure. The list command may be referred to as a sequence command, a row command, or by any other name. The list command may be initiated through interaction with a user interface, for example, a form or a graphical user interface. As another option, the single command may take the form S+, where S is a set of at least one node from the tree data structure. An exemplary use of the list command in a single command to search the tree data structure may be:

select(S+, Name=Fred)

The above command may return a set of nodes comprised of nodes that are in lists whose list head node is in the set of nodes S and whose Name field has the value Fred.

As another example, let A be a node in a tree data structure representing an organizational chart. The node A may contain a single child link named Reports, which links to a node that is a list head node for a list of all members of the organization that report directly to A. To generate this list, the command may be:

move(A, Reports+)

The above command may return all nodes in the tree data structure contained in the list whose list head node is reached by following the Reports link contained in A. This list of nodes may represent all the members of the organization who report directly to A.

Figure 5:
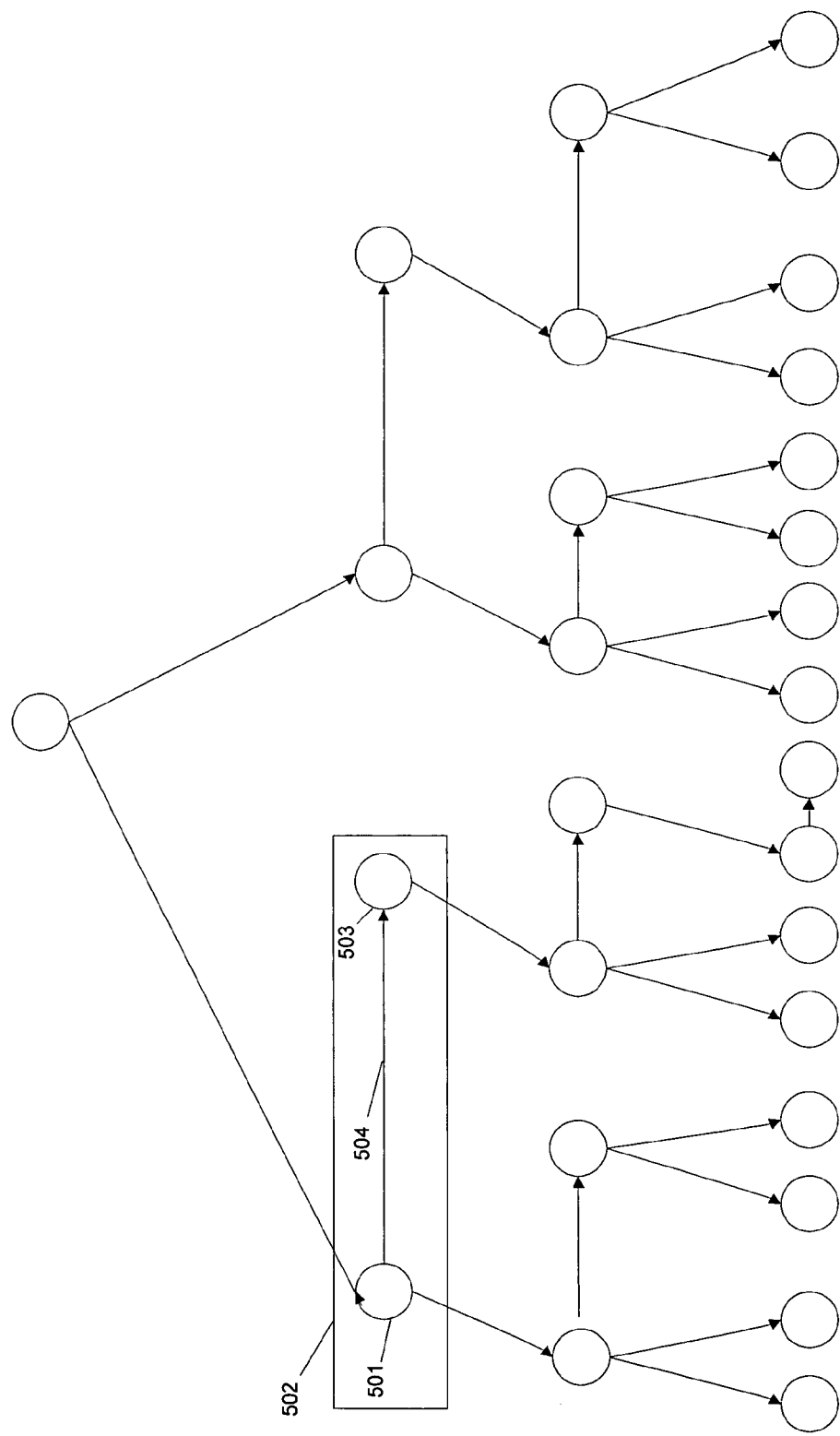
FIG. 5 depicts an exemplary embodiment of a list in a binary tree
Figure 6:
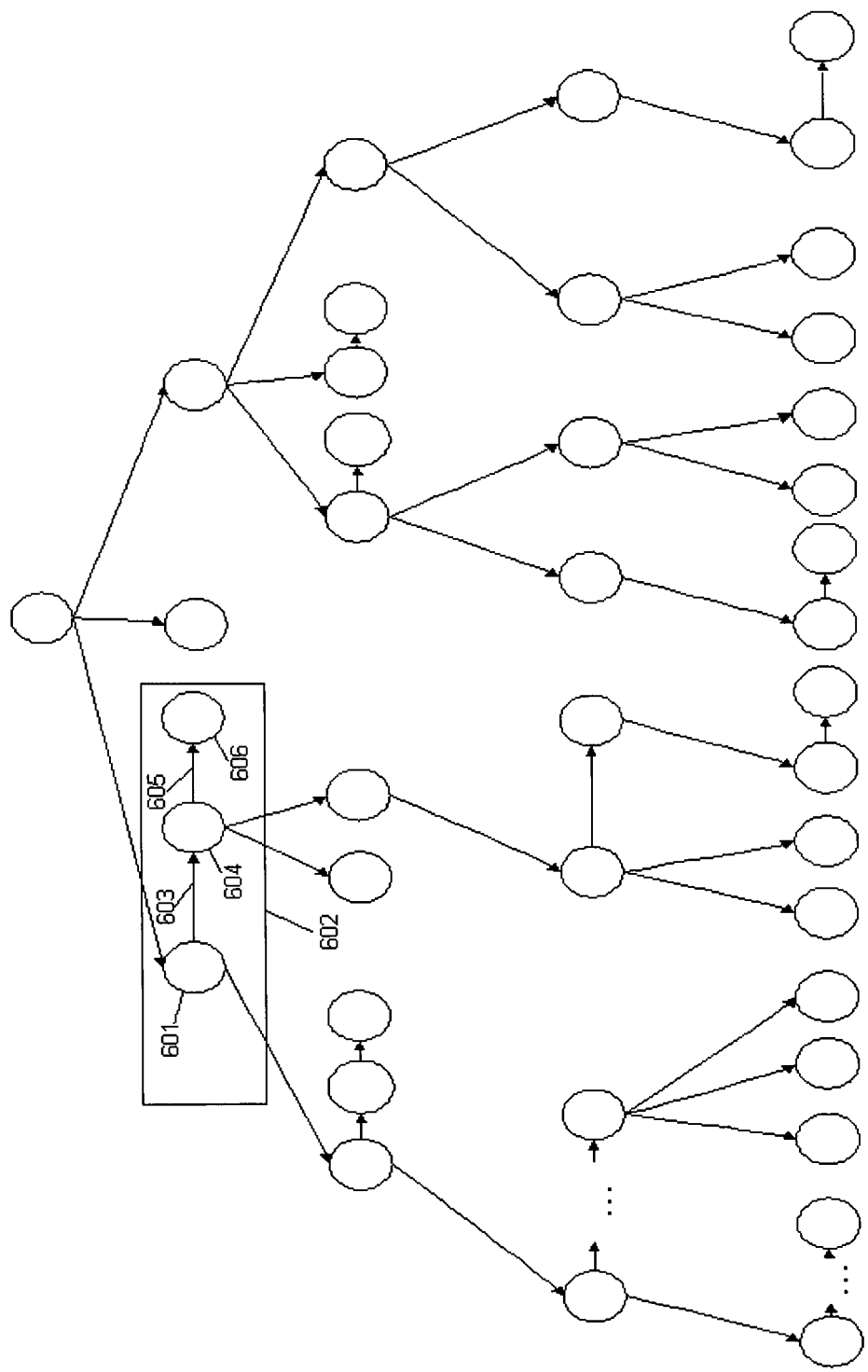
FIG. 6 depicts an exemplary embodiment of a list in an N-ary tree

FIG. 5 and FIG. 6 depict exemplary embodiments of a list in a binary tree and an N-ary tree respectively. For example, in FIG. 5 node 501 is list head node of the list 502 in the binary tree. The list 502 of which node 501 is the list head node may include node 501 and node 503. Node 503 is reached from node 501 by following next link 504. In FIG. 6, node 601 is the list head node of the list 602 in the N-ary tree. The list 602 of which node 601 is the list head node may include node 604 and 606. Node 604 may be reached from node 602 by following next link 603, and node 606 may be reached from node 604 by following the next link 605.

A subtree in the tree data structure may include a set of nodes that can be reached by recursively following child links starting from a specified node. The specified node may be referred to as the subtree head node. The subtree may include nodes which may be reached by following all of the child links contained in the subtree head, and then by following the child links in the nodes reached from the subtree head, and so on until nodes with no child links are reached. The subtree head node may also be part of the subtree. In an exemplary embodiment, a single text command may be used to access the subtree for a specified node or nodes in a tree data structure. The single command may take the form subtree (S), where S is a set of at least one node from a tree data structure. As an option, the single command may take the form S.Sub-Tree, where S is a set of at least one node from a tree data structure. As another option, single command may take the form Sˆ, where S is a set of at least one node from a tree data structure. The subtree command may be referred by any other name. The subtree command may be initiated through interaction with a user interface, for example, a form or a graphical user interface. An exemplary use of the subtree command in a single command to search a tree data structure may be:

select(Sˆ, Name=Fred)

The above command may return a set of nodes comprised of nodes that are in subtrees whose subtree head node is in the set of nodes S and whose Name field has the value Fred.

As another example, let A be a node in a tree data structure representing an organizational chart. The node A may contain a single child link named Reports, which links to a node that is a list head node for a list of all members of the organization that report directly to A. To generate a list of all members of the organization reporting to A directly or indirectly whose name is Fred, the command may be:

select(Aˆ, Name=Fred)

The above command may return all nodes in the tree data structure that link from A by following paths that do not begin with a Next link.

Figure 7:
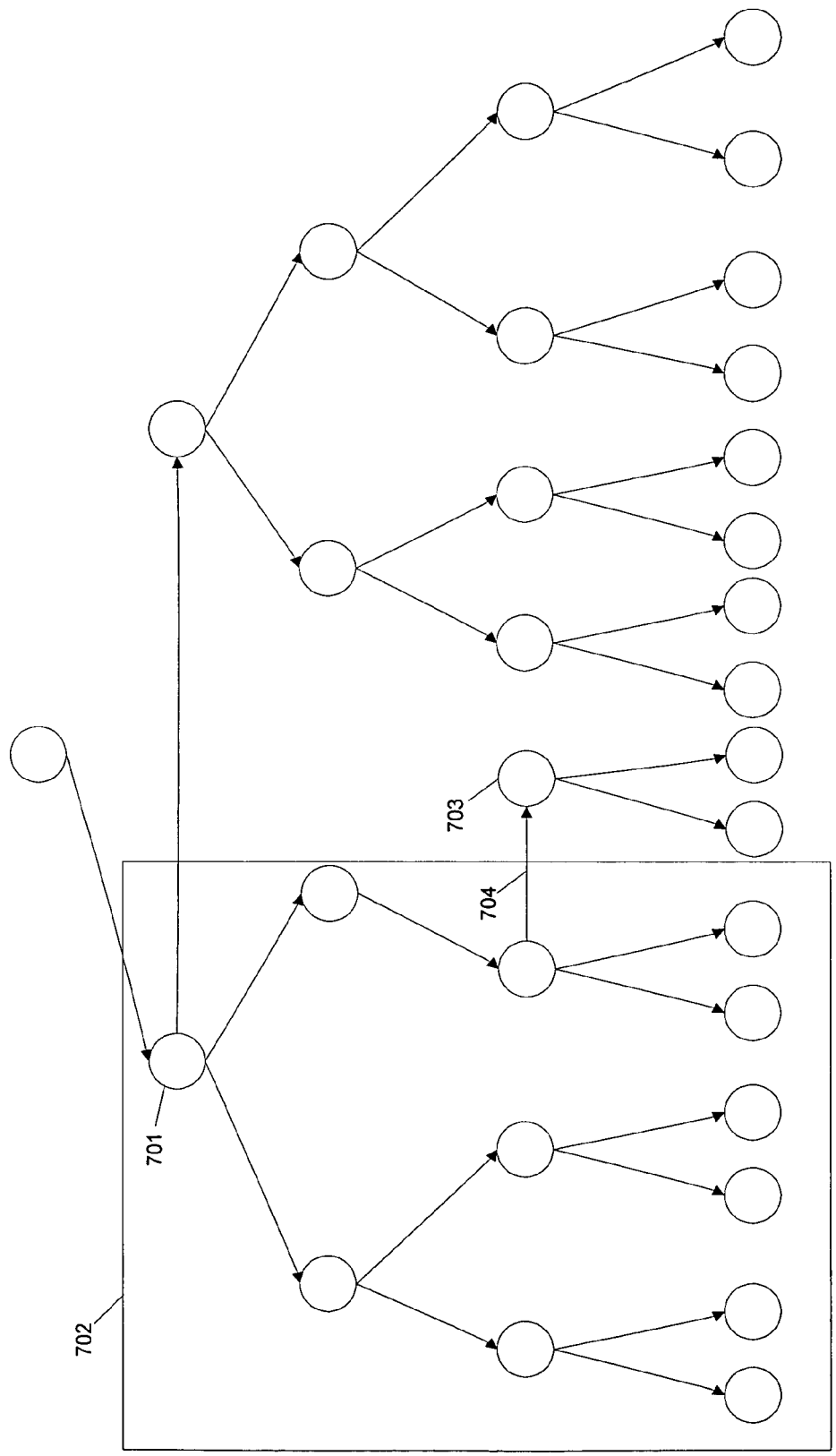
FIG. 7 depicts an exemplary embodiment of a subtree in binary tree
Figure 8:
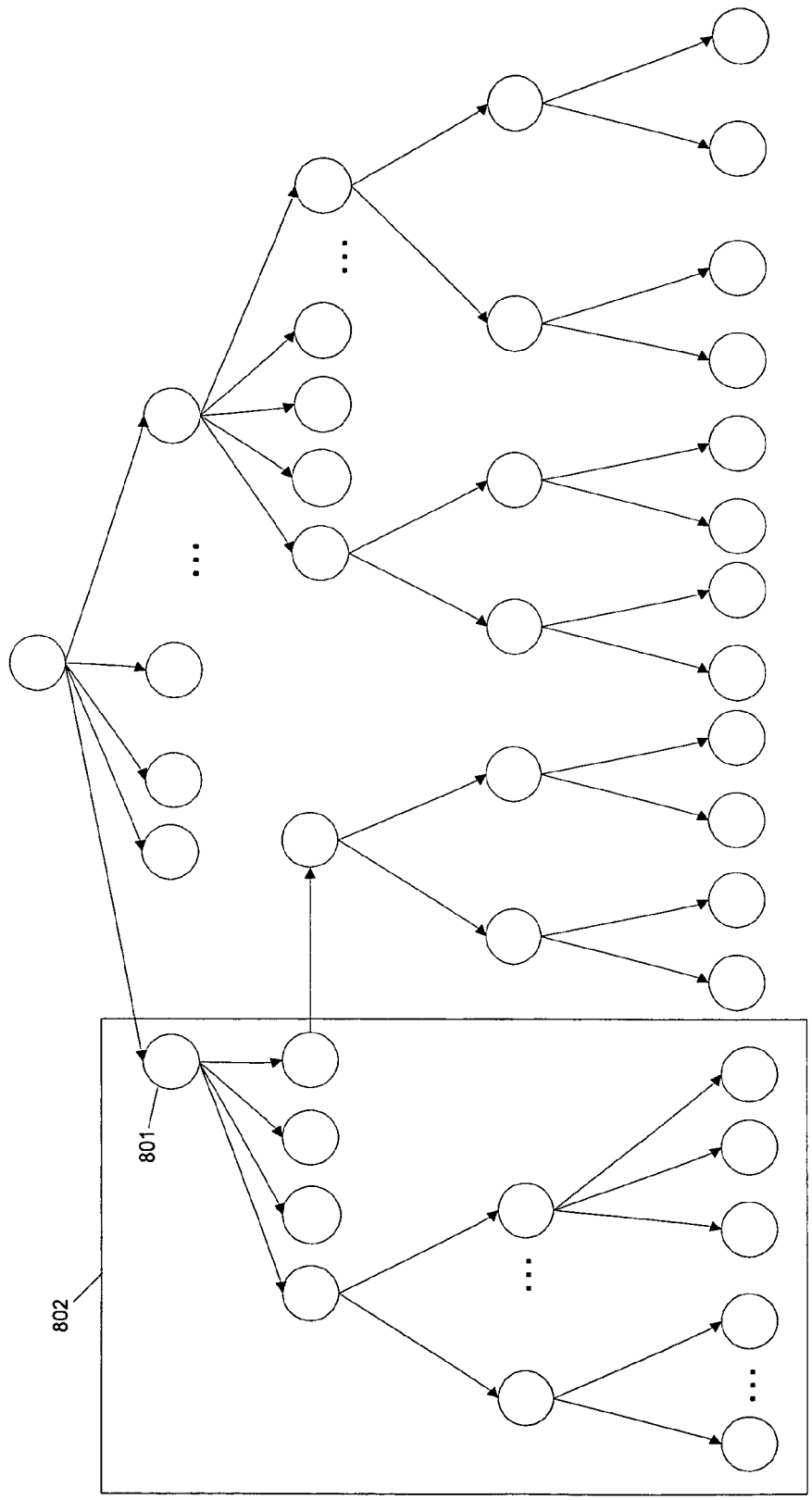
FIG. 8 depicts an exemplary embodiment of a subtree in an N-ary tree

FIG. 7 and FIG. 8 depict an exemplary embodiment of a subtree in a binary tree and an N-ary tree, respectively. For example, in FIG. 7, node 701 is the subtree head node of the subtree 702 in the binary tree. The subtree 702 of which node 701 is the subtree head node may include all nodes which can be reached by recursively following child links starting from the subtree head node 701. In the binary tree, a node may have at most two child links to follow. Node 703 may not be part of the subtree of which node 701 is the subtree head node, because it may not be reached from node 701 by following only child links. It must be reached by following next link 704. In FIG. 8, node 801 is the subtree head node of the subtree 802 in the N-ary tree. The subtree 802 of which node 801 is the subtree head node may include all nodes which can be reached by recursively following child links starting from the subtree head node 801. In an N-ary tree, there is no limit on the number of child links a node may have to be followed.

A full subtree may include a set of nodes that can be reached by recursively following child links and next links starting from all nodes included in the list of which the specified node is the list head node. The specified node may be referred to as the full subtree head node. The full subtree may include nodes which may be reached by following all of the child links and next links contained by nodes in the list of which the full subtree head node is the list head node, including the full subtree head node, and then following the child links and next links of all nodes reached in this way, and so on until nodes with no child links or next links are reached. The full subtree head node and the nodes which are in the list of which the full subtree head node is the list head node may also be included in the full subtree. In an exemplary embodiment, a single text command may be used to access the full subtree for a specified node or nodes in the tree data structure. The single command may take the form fullsubtree(S), where S is a set of at least one node from a tree data structure. As an option, the single command may take the form S.Tree, where S is a set of at least one node from the tree data structure. As another option, the single command may take the form S*, where S is a set of at least one node from the tree data structure. An exemplary use of a fullsubtree command in a single command to search the tree data structure may be:

move (S, Report*).

The above command may return a set of nodes comprised of nodes that report into the organizations headed by members of S.

Figure 9:
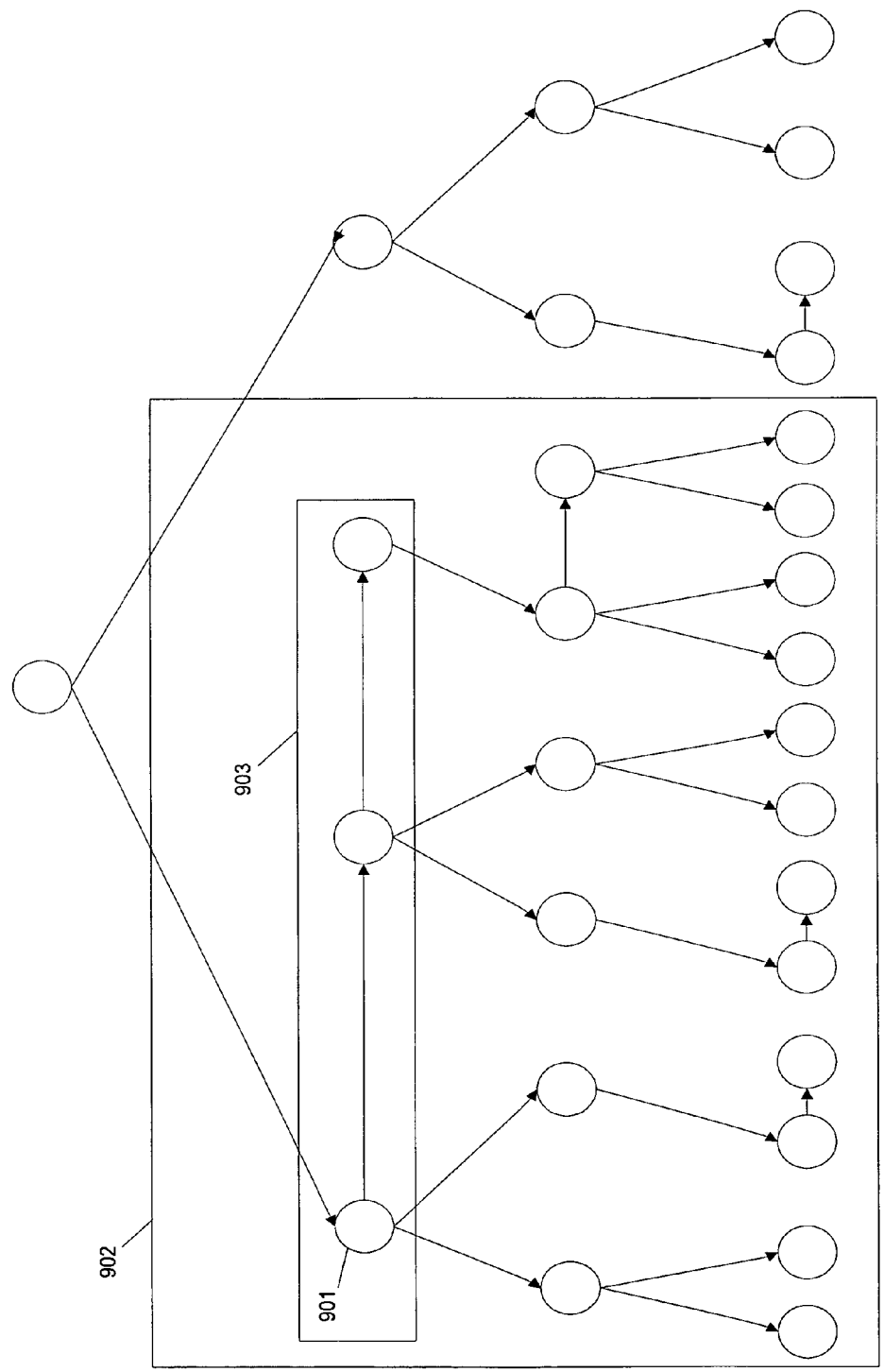
FIG. 9 depicts an exemplary embodiment of a full subtree in a binary tree
Figure 10:
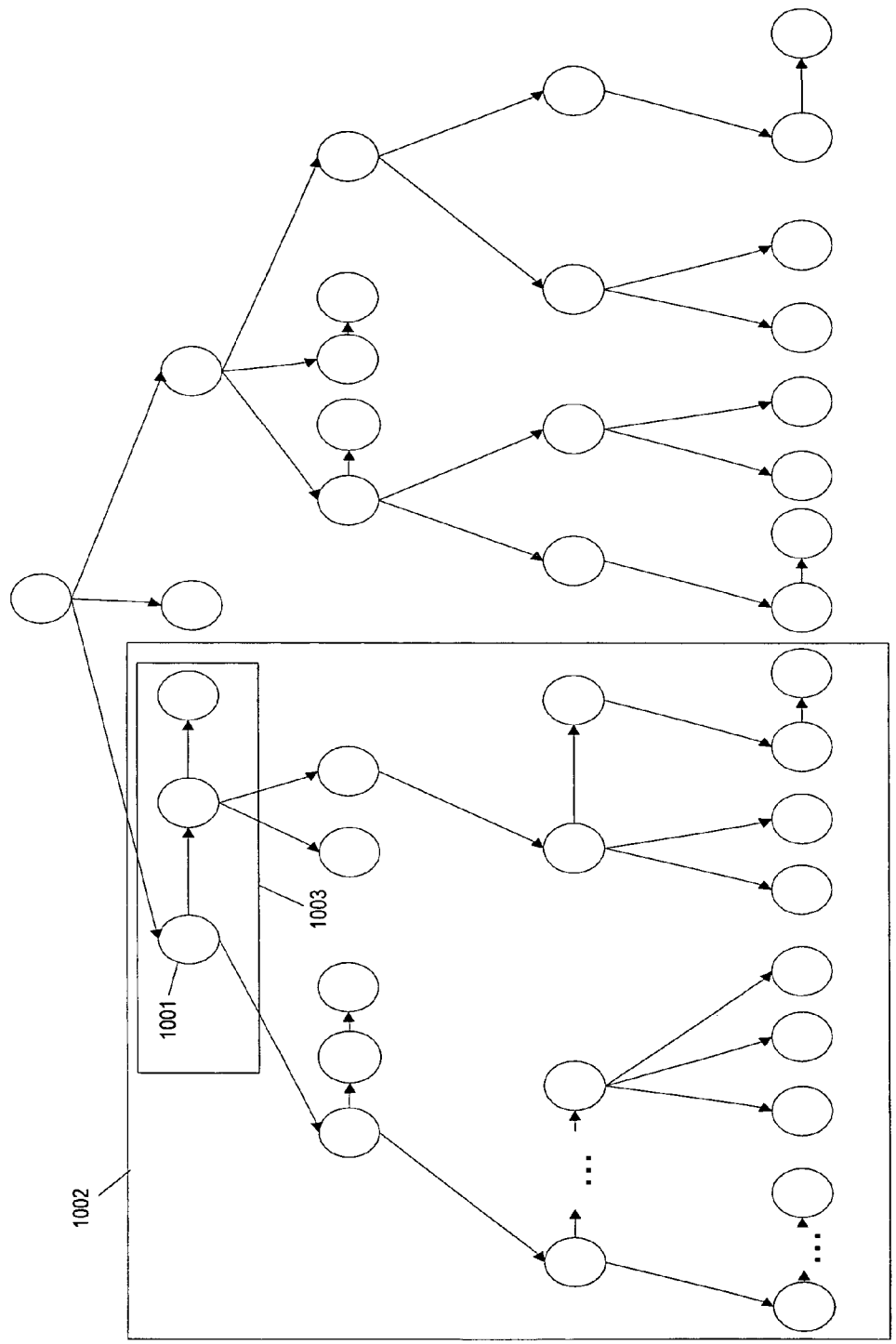
FIG. 10 depicts an exemplary embodiment of a full subtree in an N-ary tree

FIG. 9 and FIG. 10 depict an exemplary embodiment of a full subtree in a binary tree and an N-ary tree, respectively. In FIG. 9, node 901 is the full subtree head node for the full subtree 902 in the binary tree. The full subtree 902 of which node 901 is the full subtree head node may include all nodes which can be reached by recursively following child links and next links from each node in the list 903 of which node 901 is the list head node. In FIG. 10, node 1001 is the full subtree head node for the full subtree 1002 in the N-ary tree. The full subtree 1002 of which node 1001 is the full subtree head node may include all nodes which can be reached by recursively following child links and next from each node in the list 1003 of which the node 1001 is the list head node.

The above commands may be employed along with logical operators in the searching of tree data structures. Logical operators may include the EQUALS operator, the AND operator and the OR operator.

The EQUALS logical operator is may be used to specify an equality between two items and return true if the items are the same. An EQUALS logical operator may be provided for the searching of tree data structures. The EQUALS logical operator may be used to match a particular pattern to a particular node returned by some combination of the above specified operators. The EQUALS operator may take the form =, or it may be implied by the ordering of arguments to one of the above specified commands, or it may take any other appropriate form. A single text command employing the EQUALS operator to search a tree data structure may be:

select(S, Name=Fred)

The above command may a return a set of nodes comprised of nodes in the set of nodes S which have a Name field value of Fred. The EQUALS command is implicit in the ordering of arguments for the select command.

The AND logical may be used to specify a junction between two items and return true only if both of those items are true. An AND logical operator may be provided for the searching of tree data structures. The AND logical operator may be used to match a particular pattern to every node returned by some combination of the above specified operators. The AND operator may take the form &. The AND operator may take the form ALL. The AND operator may take any other appropriate form. An exemplary single text command employing the AND operator to search a tree data structure may be:

select(S+&, Name=Fred)

The above command may return those nodes in the set of nodes S which are the list head node for a list in which all nodes have Name fields with the value Fred.

The OR logical operator may be used to specify a disjunction between two items and return true if at least one of those items is true. An OR logical operator may be provided for the searching of tree data structures. The OR logical operator may be used to match a particular pattern to at least one node returned by some combination of the above specified operators. The OR operator may take the form |. The OR operator may take the form ANY. The OR operator may take any other appropriate form. An exemplary single text command employing the OR operator to search a tree data structure may be:

select(S+|, Name=Fred)

The above command may return those nodes in the set of nodes S which are the list head node for a list in which at least one node has a Name field value of Fred.

In an exemplary embodiment, commands for following links may also be provided. As noted above, a link, connects a node to another node. A node may contain links to child nodes. A node may also contain one or more links to their parent nodes, and next links. Links may be given descriptive names that may be used in the commands for following links. For example, in a binary tree, one child link may be named left and the other child link may be named right. The command left results in the child link named left being followed to the node to which it links. The command right results in the child link being followed to the node to which it links. If a node contains a next link, that link may be followed by the command next. Link names may be more descriptive. For example, in an N-ary tree where a node may contain more than two links, a link may be named first, a second link may be named second, a third link may be named third, and so on. The name of a link may be used as the command to follow the link.

Through the combination of the select, move, list, tree, subtree and link following commands and the logical operators, such as EQUALS, AND and OR, it may be possible to search a tree data structure using a single text command.

Figure 11:
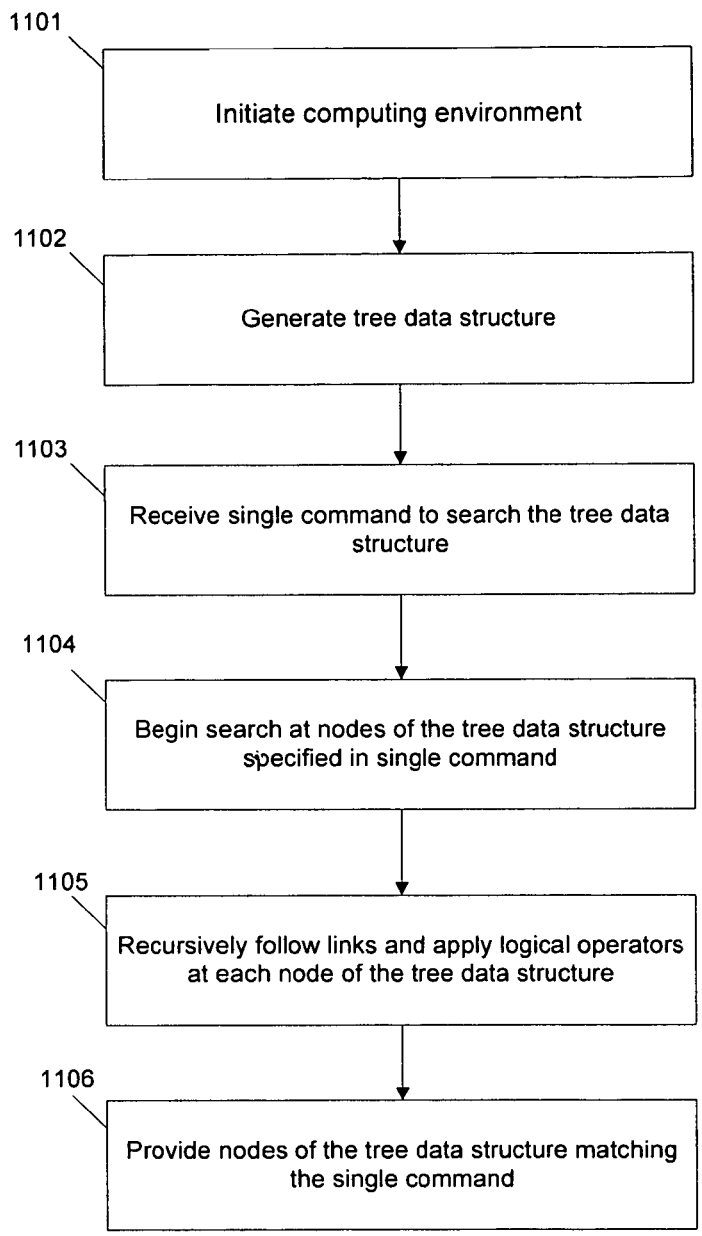
FIG. 11 depicts an exemplary flowchart for a method of searching a tree data structure based on a single command.
Figure 12:
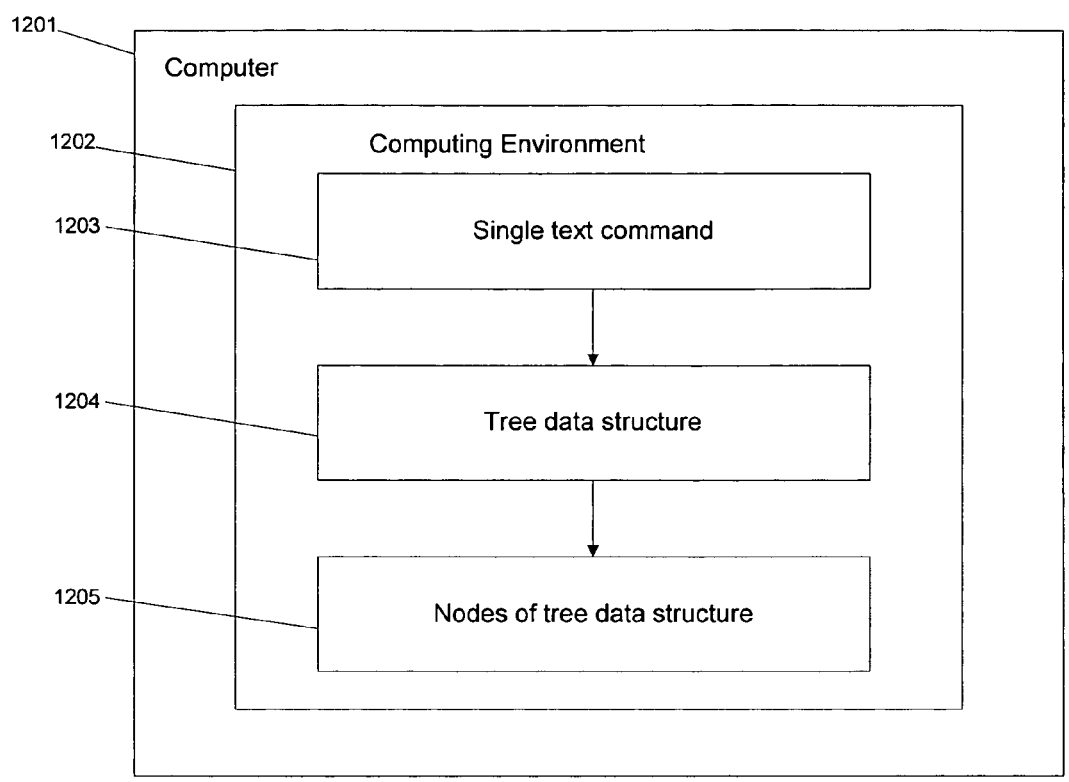
FIG. 12 depicts an exemplary apparatus for searching a tree data structure based on a single command.

FIG. 11 depicts an exemplary flowchart for a process of performing a search on a tree structure with a single text command, and FIG. 12 depicts an exemplary apparatus for use with the exemplary flowchart of FIG. 11.

In block 1101, a computing environment 1202 may be initiated on a computer 1201. The computing environment 1202 may be, for example, MATLAB® or C++ Integrated Development Environment.

In block 1102, a tree data structure 1203 may be generated in the computing environment 1202. The tree data structure 1203 may be, for example, a binary tree data structure or an N-ary tree data structure. In generating the tree data structure 1203, the tree data structure 1203 may be created in or loaded into the computing environment 1202. The tree data structure 1203 may be created using appropriate commands within the computing environment 1202. The tree data structure 1203 may be loaded into the computing environment 1202 from, for example, a file which stores the tree data structure 1203. The file may be stored on the computer 1201 or accessed a via a networked coupled to the computer 1201.

In block 1103, the computing environment 1202 may receive a single text command 1204 for searching the tree data structure 1203. The single text command 1204 may be of the type described above. The single text command 1204 may include at least one of the list, subtree, or link following commands along with zero or more of the select, move, tree, and logical operators, such as EQUALS, AND and OR.

In block 1104, the search of the tree data structure 1202 based on the single text command 1204 may begin at the one or more of the nodes specified in the single text command 1204. If the set of nodes specified in the single text command 1204 encompass the entire tree data structure 1203, the search may begin at the one or more top nodes of the tree data structure. For example, if the tree data structure 1203 is a binary tree data structure, the search based on the single text command 1204 may begin at the single top node of the binary tree data structure. If the tree data structure 1203 is an N-ary tree data structure, the search may begin at each of the one or more top nodes of the N-ary tree data structure.

In block 1105, the search of the tree data structure 1203 based on the single text command 1204 may proceed from the specified nodes of the tree data structure 1203 to the rest of the tree data structure 1203 by recursively following the appropriate links as specified by the single command and applying appropriate logical operators at each node reached by following a link. For example, if the single text command 1204 includes a list command, the search may recursively follow next links. If the single text command 1204 includes a subtree command, the search may recursively follow child links. If the single text command 1204 includes a full subtree command, the search may recursively follow both next and child links. The search may also follow any other link following commands contained in the single command, for example, a command to follow a link with a specific name. Upon reaching a node by following a link, the search may apply appropriate logical operators from a single text command 1204. For example, if there is an EQUALS operator in the single text command 1204, the search may determine if the value for a particular field at the node is equal to the value specified in the EQUALS operator.

In block 1106, the set of nodes 1205 that match the search criteria in the single text command 1204 for searching the tree data structure 1203 may be provided. The set of nodes 1205 may be provided by being displayed via a monitor, for example. As another example, the set of nodes 1205 may be provided by being stored in a file or stored in a data structure within the computing environment.

Figure 13:
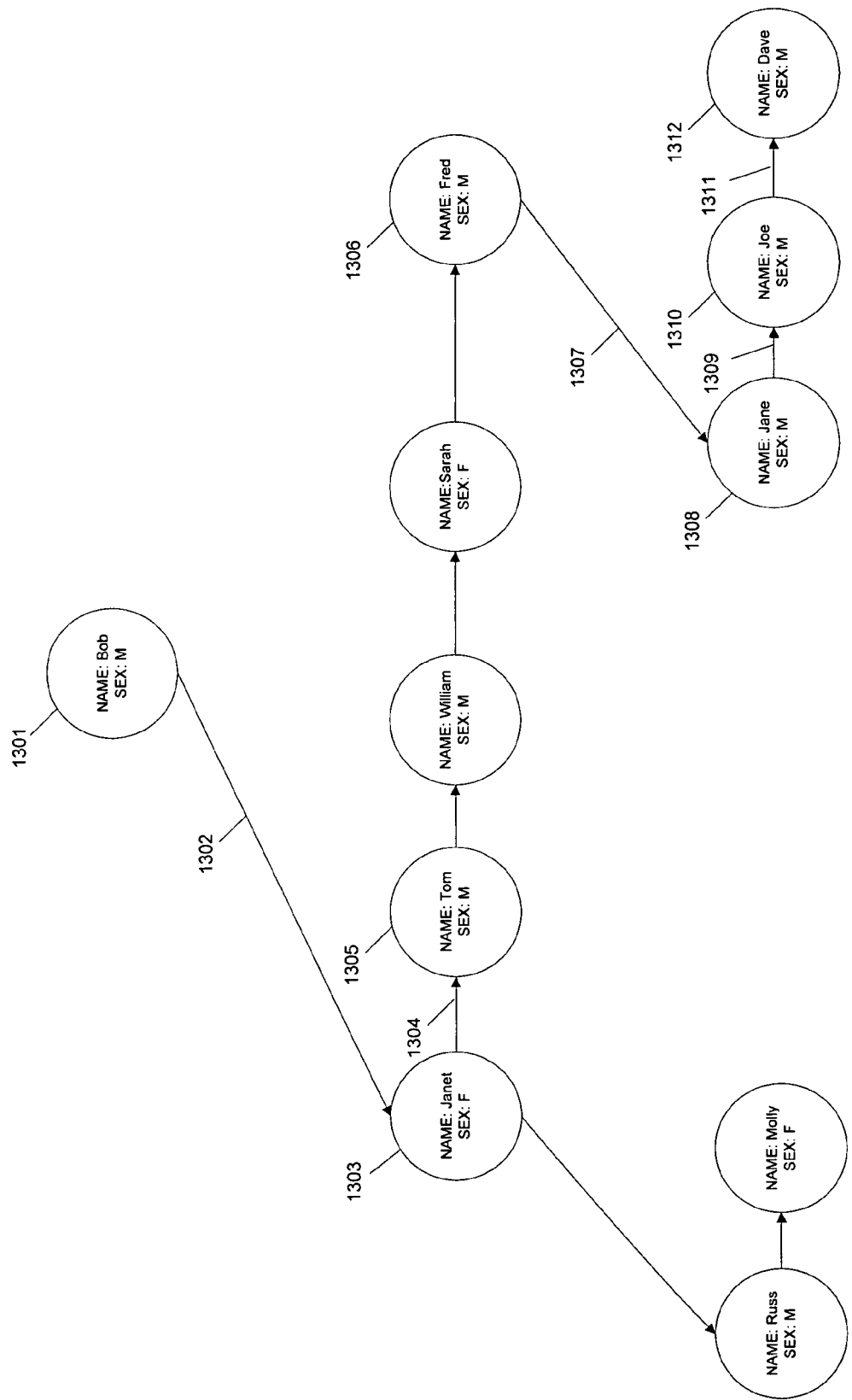
FIG. 13 depicts an exemplary organizational chart stored in a tree data structure

As an example of performing a search on a tree data structure with a single command, let S be the tree data structure representing an entire organization, and let the nodes in S represent individuals working in the organization. FIG. 13 is an exemplary embodiment a tree data structure representing an entire organization. Each node in S may contain a plurality of fields containing data about the individual the node represents. For example, a Name field may contain the individual's name, and a Sex field may contain the individual's gender. Referring to FIG. 13, each node 1301, 1303, 1305, 1306, 1308,1310, 1312, etc., contains a Name field and Sex field. Each node in S may contain links. For example a node in S may contain a next link of the next type discussed above, and a child link which links to a node, representing an individual, which is the list head node for a list of nodes representing individuals who report directly to the individual represented by the node containing the child link. The child link may be called Reports. Referring to FIG. 13, as an example, node 1301 contains child link 1302, linking to node 1303. Node 1306 contains reports link 1307 linking to node 1308. As an example, nodes 1303, 1305, 1308, and 1310 contain next links linking to their respective next nodes. Utilizing the commands and operators described above, the tree data structure may be searched using a single command. For example:

select(S, Name=Fred, Reports+|, Name=Joe)

The above command may search the entire tree data structure and return those nodes in S representing an individual named Fred to whom an individual named Joe reports. The search may determine which nodes in S have a Name field value of Fred, and then follow the reports link from those nodes to determine if the list whose list head node is linked by the reports link contains a node with a Name field value of Joe. Node 1306 has a Name field value of Fred. The child link 1307 of node 1306 links to node 1308. The nodes in the list 1313 of which node 1308 is list head node may found by following next link 1309 to node 1310 and next link 1311 to node 1312. Node 1310 has a Name field value of Joe therefore Node 1306 represents an individual to whom an individual named Joe reports. The above command will provide node 1306.

Figure 14:
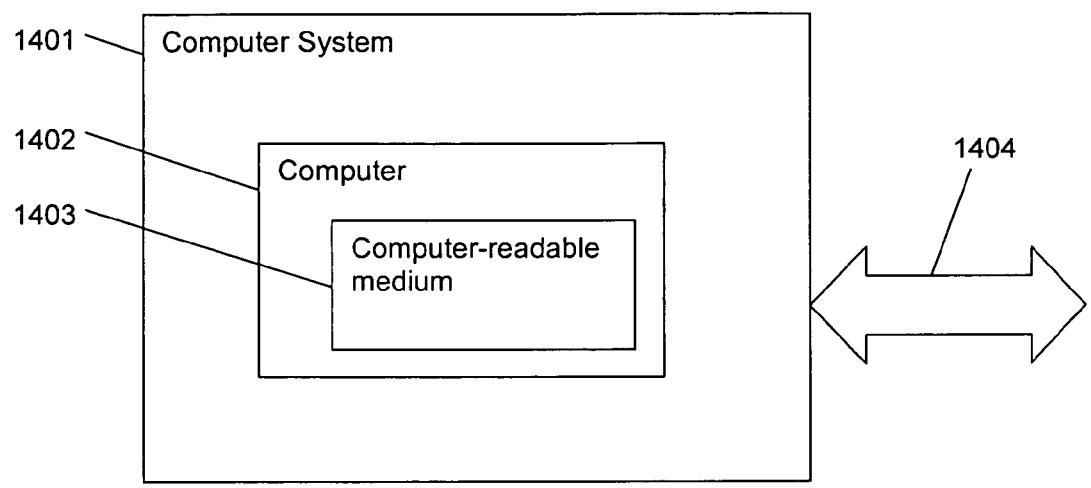
FIG. 14 depicts a computer system for use with embodiments of the present invention.

FIG. 14 depicts a computer system for use with embodiments of the present invention. The computer system 1401 includes a computer 1402 for implementing the embodiments. The computer 1402 includes a computer-readable medium 1403 embodying software for implementing the invention and/or software to operate the computer 1402 in accordance with the invention. As an option, the computer system 1401 includes a connection to a network 1404. With this option, the computer 1402 is able to send and receive information (e.g., software, data, documents) from other computer systems via the network 1404.

Figure 15:
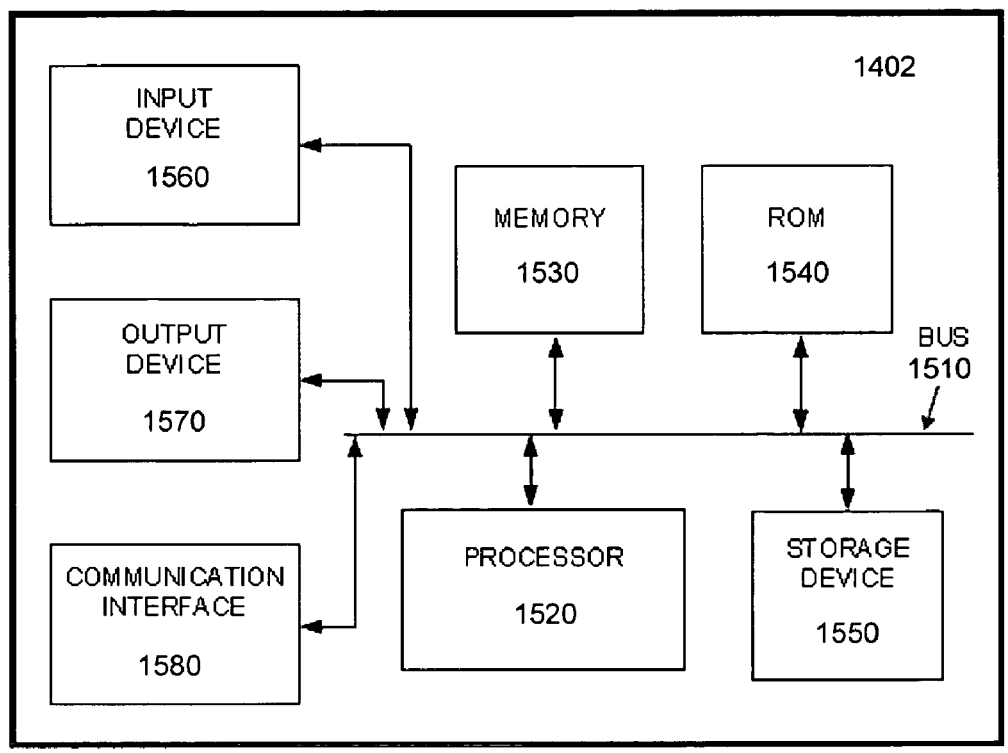
FIG. 15 illustrates an exemplary computer architecture for a computer system for use with embodiments of the present invention.

FIG. 15 illustrates an exemplary architecture for implementing the computer 1430 of FIG. 14. It will be appreciated that other devices that can be used with the computer 1402, such as a client or a server, may be similarly configured. As illustrated in FIG. 2, computer 1402 may include a bus 1510, a processor 1520, a memory 1530, a read only memory (ROM) 1540, a storage device 1550, an input device 1560, an output device 1570, and a communication interface 1580.

Bus 1510 may include one or more interconnects that permit communication among the components of computer 1402. Processor 1520 may include any type of processor, microprocessor, or processing logic that may interpret and execute instructions (e.g., a field programmable gate array (FPGA)). Processor 1520 may include a single device (e.g., a single core) and/or a group of devices (e.g., multi-core). Memory 1530 may include a random access memory (RAM) or another type of dynamic storage device that may store information and instructions for execution by processor 1520. Memory 1430 may also be used to store temporary variables or other intermediate information during execution of instructions by processor 1520.

ROM 1540 may include a ROM device and/or another type of static storage device that may store static information and instructions for processor 1520. Storage device 1550 may include a magnetic disk and/or optical disk and its corresponding drive for storing information and/or instructions. Storage device 1550 may include a single storage device or multiple storage devices, such as multiple storage devices operating in parallel. Moreover, storage device 1550 may reside locally on the computer 1402 and/or may be remote with respect to a server and connected thereto via network and/or another type of connection, such as a dedicated link or channel.

Input device 1560 may include any mechanism or combination of mechanisms that permit an operator to input information to computer 1402, such as a keyboard, a mouse, a touch sensitive display device, a microphone, a pen-based pointing device, and/or a biometric input device, such as a voice recognition device and/or a finger print scanning device. Output device 1570 may include any mechanism or combination of mechanisms that outputs information to the operator, including a display, a printer, a speaker, etc.

Communication interface 1580 may include any transceiver-like mechanism that enables computer 1402 to communicate with other devices and/or systems, such as a client, a server, a license manager, a vendor, etc. For example, communication interface 1580 may include one or more interfaces, such as a first interface coupled to a network and/or a second interface coupled to a license manager. Alternatively, communication interface 1580 may include other mechanisms (e.g., a wireless interface) for communicating via a network, such as a wireless network. In one implementation, communication interface 1580 may include logic to send code to a destination device, such as a target device that can include general purpose hardware (e.g., a personal computer form factor), dedicated hardware (e.g., a digital signal processing (DSP) device adapted to execute a compiled version of a model or a part of a model), etc.

Computer 1402 may perform certain functions in response to processor 1420 executing software instructions contained in a computer-readable medium, such as memory 1530. In alternative embodiments, hardwired circuitry may be used in place of or in combination with software instructions to implement features consistent with principles of the invention. Thus, implementations consistent with principles of the invention are not limited to any specific combination of hardware circuitry and software.

An exemplary embodiment of the invention may be embodied in many different ways as a software component. For example, it may be a stand-alone software package, or it may be a software package incorporated as a "tool" in a larger software product, such as, for example, a mathematical analysis product or a statistical analysis product. It may be downloadable from a network, for example, a website, as a stand-alone product or as an add-in package for installation in an existing software application. It may also be available as a client-server software application, or as a web-enabled software application.

What is claimed is:

1. A computer-implemented method to access a tree data structure in a computing environment, the method comprising:

generating the tree data structure in the computing environment, the tree data structure having:

a plurality of nodes, a node in the plurality of nodes embodying a plurality of fields for a plurality of data types, and at least one child link and at least one next link, the at least one child link and the at least one next link being used to link two or more nodes in the plurality of nodes;

accessing contents of the tree data structure with a single command in the computing environment, the single command including:

a reference to at least one node of the tree data structure, a first user-defined argument representing at least one of:
a particular property of the at least one node, or
a relation of the at least one node to at least one other node, and a second user-defined argument representing at least one of:
a command to access contents of the tree data structure by following one or more child links in the tree data structure and one or more next links in the tree data structure,
a command to access contents of the tree data structure by following one or more child links in the tree data structure and not following a next link in the tree data structure while the next link is present, or
a command to access contents of the tree data structure by following one or more next links in the tree data structure and not following a child link in the tree data structure, the single command accessing contents of the tree data structure based on the first user-defined argument and the second user-defined argument; and providing in the computing environment the contents of the tree data structure based on the single command.

2. The method of claim 1, wherein the at least one next link links a first node to a second node, the second node not a child node of any node.

3. The method of claim 1, wherein the contents of the tree data structure provided in the computing environment based on the single command comprise nodes from the tree data structure.

4. The method of claim 1, wherein the contents of the tree data structure provided in the computing environment based on the single command comprise at least one of a plurality of fields for a plurality of data types embodied within at least one node of the tree data structure.

5. The method of claim 1, wherein the command to access contents of the tree data structure by following one or more next links in the tree data structure and not following a child link in the tree data structure comprises recursively following each next link from the at least one node referenced.

6. The method of claim 1, wherein the command to access contents of the tree data structure by following one or more child links in the tree data structure and not following a next link in the tree data structure comprises recursively following the each child link from the at least one node referenced.

7. The method of claim 1, wherein the command to access contents of the tree data structure by following one or more child links in the tree data structure and one or more next links in the tree data structure comprises recursively following each child link and each next link from the at least one node referenced and recursively following each child link and each next link from each node accessible by recursively following each next link from the at least one node referenced.

8. The method of claim 1, wherein the single command comprises at least one logical operator.

9. The method of claim 8, wherein at least one logical operator is the EQUALS operator, the AND operator, or the OR operator.

10. The method of claim 1, wherein the tree data structure is a binary tree data structure or an N-ary tree data structure.

11. The method of claim 1, where the computing environment is capable of interpreting an array-based language.

12. The method of claim 11, wherein the array-based language comprises a subset of commands executable in the MATLAB computing environment.

13. The method of claim 1, where the computing environment is a graphical computing environment.

14. The computer-implemented method for a computing environment to access tree data structures, said method comprising:
downloading software to a computer system, which when executed by the computer system causes the computer system to perform operations comprising the method of claim 1.

15. The computer-implemented method for a computing environment to access tree data structures, comprising:
providing downloadable software to a computer system, which when executed by the computer system causes the computer system to perform operations comprising the method of claim 1.

16. The method of claim 1, wherein accessing the contents of the tree data structure comprises identifying the at least one node of the tree data structure that has the particular property, wherein the particular property comprises a value of a specific data field stored in the at least one node.

17. The method of claim 1, wherein accessing the contents of the tree data structure comprises identifying the at least one other node with which the at least one node of the tree data structure has the relation, wherein the relation of the at least one node to the at least one other node comprises a link stored in the at least one node.

18. A computer-readable medium holding instructions, which, when executed by a computer system, cause the computer system to access a tree data structure, the instructions comprising:
instructions for generating the tree data structure in the computing environment, the tree data structure having:
a plurality of nodes, a node in the plurality of nodes embodying a plurality of fields for a plurality of data types, and
at least one child link and at least one next link, the at least one child link and the at least one next link being used to link two or more nodes in the plurality of nodes;
instructions for accessing contents of the tree data structure with a single command in the computing environment, the single command including:
a reference to at least one node of the tree data structure,
a first user-defined argument representing at least one of:
a particular property of the at least one node, or
a relation of the at least one node to at least one other node, and
a second user-defined argument representing at least one of:
a command to access contents of the tree data structure by following one or more child links in the tree data structure and one or more next links in the tree data structure,
a command to access contents of the tree data structure by following one or more child links in the tree data structure and not following a next link in the tree data structure while the next link is present, or a command to access contents of the tree data structure by following one or more next links in the tree data structure and not following a child link in the tree data structure,
the single command accessing contents of the tree data structure based on the first user-defined argument and the second user-defined argument; and
instructions for providing in the computing environment the contents of the tree data structure based on the single command.

19. The computer-readable medium of claim 18, wherein the at least one next link links a first node to a second node, the second node not a child node of any node.

20. The computer-readable medium of claim 18, wherein the contents of the tree data structure provided in the computing environment based on the single command comprise nodes from the tree data structure.

21. The computer-readable medium of claim 18, wherein the contents of the tree data structure provided in the computing environment based on the single command comprise at least one of a plurality of fields for a plurality of data types embodied within at least one node of the tree data structure.

22. The computer-readable medium of claim 18, wherein the command to access contents of the tree data structure by following one or more next links in the tree data structure and not following a child link in the tree data structure comprises recursively following each next link from the specified at least one node referenced.

23. The computer-readable medium of claim 18, wherein the command to access contents of the tree data structure by following one or more child links in the tree data structure and not following a next link in the tree data structure comprises recursively following the each child link from the at least one node referenced.

24. The computer-readable medium of claim 18, wherein the command to access contents of the tree data structure by following one or more child links in the tree data structure and one or more next links in the tree data structure comprises recursively following each child link and each next link from the at least one node referenced and recursively following each child link and each next link from each node accessible by recursively following each next link from the at least one node referenced.

25. The computer-readable medium of claim 18, wherein the single command comprises at least one logical operator.

26. The computer-readable medium of claim 25, wherein at least one logical operator is the EQUALS operator, the AND operator, or the OR operator.

27. The computer-readable medium of claim 18, wherein the tree data structure is a binary tree data structure or an N-ary tree data structure.

28. The computer-readable medium of claim 18, where the computing environment is capable of interpreting an array-based language.

29. The computer-readable medium of claim 28, wherein the array-based language comprises a subset of commands executable in the MATLAB computing environment.

30. The computer-readable medium of claim 18, where the computing environment is a graphical computing environment.

31. A system to access a tree data structure in a computing environment comprising:
means for generating the tree data structure in the computing environment, the tree data structure having:
a plurality of nodes, a node in the plurality of nodes embodying a plurality of fields for a plurality of data types, and
at least one child link and at least one next link, the at least one child link and the at least one next link being used to link two or more nodes in the plurality of nodes;
means for accessing contents of the tree data structure with a single command in the computing environment, the single command including:
a reference to at least one node of the tree data structure,
a first user-defined argument representing at least one of:
a particular property of the at least one node, or
a relation of the at least one node to at least one other node, and
a second user-defined argument representing at least one of:
a command to access contents of the tree data structure by following one or more child links in the tree data structure and one or more next links in the tree data structure,
a command to access contents of the tree data structure by following one or more child links in the tree data structure and not following a next link in the tree data structure while the next link is present, or
a command to access contents of the tree data structure by following one or more next links in the tree data structure and not following a child link in the tree data structure,
the single command accessing contents of the tree data structure based on the first user-defined argument and the second user-defined argument; and
means for providing in the computing environment the contents of the tree data structure based on the single command.

* * * * *